US006617910B2

(12) United States Patent
Quan

(10) Patent No.: US 6,617,910 B2
(45) Date of Patent: Sep. 9, 2003

(54) LOW NOISE ANALOG MULTIPLIER UTILIZING NONLINEAR LOCAL FEEDBACK ELEMENTS

(76) Inventor: Ronald Quan, 10910 Wunderlich Dr., Cupertino, CA (US) 95014

( * ) Notice: Subject to any disclaimer, the term of this patent is extended or adjusted under 35 U.S.C. 154(b) by 0 days.

(21) Appl. No.: 09/928,181

(22) Filed: Aug. 10, 2001

(65) Prior Publication Data

US 2003/0030480 A1 Feb. 13, 2003

(51) Int. Cl.[7] .............................................. G06F 7/556
(52) U.S. Cl. ...................................... 327/359; 327/358
(58) Field of Search ................................ 327/359, 363, 327/355, 356, 358, 116, 119

(56) References Cited

U.S. PATENT DOCUMENTS

| | | | | |
|---|---|---|---|---|
| 4,331,929 A | * | 5/1982 | Yokoyama | 330/252 |
| 4,588,909 A | | 5/1986 | Quan | 327/362 |
| 4,928,074 A | * | 5/1990 | Sato et al. | 330/254 |

OTHER PUBLICATIONS

National Semiconductor Corp, Linear Databook 3 Lm1596/LM1496 Balanced Modulaated Demodulator pp. 5–92 Schematic, 1988.

National Semiconductor Corp, Linear Data Book3 LM1863 AM Radio System for Electronically Tuned Radios; p. 2–22, Q16–Q20 and D3, D4,. 1988.

Analog Devieces 1992, Special Linear Reference Manual p. 2–4, Basic Four–Quadrant Variable Transconductance Multiplier Circuit p. 2–29, "Simplified Schematic of AD539 Multiplier". PA 2–28 "RTO Noise".

Motorola Linear. Interface ICS Device Data Book vol 11 DL128/D Rev 4, 1993, p. 11–26 Fig 3, Q5–Q8.

* cited by examiner

*Primary Examiner*—Timothy P. Callahan
*Assistant Examiner*—Cassandra Cox
(74) *Attorney, Agent, or Firm*—George Almeida

(57) ABSTRACT

A voltage controlled amplifier is improved in noise performance with nonlinear local feedback elements while maintaining low distortion for various control settings. By paralleling nonlinear elements, distortion is further improved. Preferably, these nonlinear elements consist of diode pairs connected to the emitters of a differential amplifier whereby the bases of the transistors are used to control the signal current.

37 Claims, 12 Drawing Sheets

LOW NOISE ANALOG MULTIPLIER UTILIZING NONLINEAR LOCAL FEEDBACK ELEMENTS

BACKGROUND OF THE INVENTION

The present invention relates to circuits in the field of analog multipliers and, more specifically, to those types of multiplier circuits whose operation generally does not involve switching on and off of elements such as transistors and/or diodes. In the current technology, each transistor in an analog multiplier's differential pair where the output is taken, contributes random noise from internal base series resistance, and also each transistor contributes random noise from its collector-to-emitter shot noise current generator.

In the case of a balanced multiplier, such as an LM 1496 or a mixer circuit such as in an LM 1863, both manufactured by National Semiconductor in Santa Clara, Calif., the noise in question comes from the two upper differential pair amplifiers where their bases and collectors are coupled to each other. These upper two differential amplifiers suffer from noise due to their internal base series resistance and collector current shot noise sources. In addition, these "output" amplifiers are sensitive to external noise from one of their inputs, that is, the bases of the upper differential pair amplifiers.

SUMMARY OF THE INVENTION

An object of the present invention is to provide an improved signal to noise ratio for a gain control amplifier, analog mixer or multiplier, to lower output noise caused by internal noise and/or to desensitize external noise to an input.

Another object of the invention is to increase the dynamic range of multiplier or mixer circuits known as "Gilbert Quads," double balanced analog multiplier circuits, single balanced multiplier circuits, and/or voltage controlled amplifier circuits.

It is another object to maintain or reduce low distortion at the multiplier's output, or at the voltage controlled amplifier's output, as the control voltage is varied.

It is yet another object of the invention to not only maintain low distortion, but to further improve on linearity at the output of the voltage controlled amplifier or mixer as the control voltage is varied. This improvement involves paralleled diodes, paralleled diodes in series, serial strings of diodes in parallel, or the like as local feedback elements.

It is also another object of the invention to use similar principles and apply them to single ended amplifiers so that there is an increase in dynamic range with lower distortion when gain control is applied. The single ended controlled amplifier can be used in for example, intermediate frequency (IF) amplifiers in radio receivers.

It is yet another object of the invention to disclose various embodiments of predistortion circuits for improved linearity of multiplier or voltage controlled amplifiers. These predistortion circuits when coupled to a preferred embodiment of this invention comprise a true two port analog multiplier with improved characteristics (i.e., lower noise and/or distortion) over a prior art two port multiplier such as an MC 1495, manufactured by Motorola.

A first embodiment of the invention involves adding a nonlinear element or elements in the local feedback path of at least one differential amplifier to lower noise in a mixer circuit thereof and/or to increase linearity in the mixer circuit. This nonlinear element may be a transistor connected as a diode in series with each differential amplifier's emitter. In general, it is preferred that the series diodes are connected in a pair or in multiple pairs. Because each of the diodes does have a nominal small signal resistance for a given particular emitter current, the diode pair or pairs serve as a means for reducing the output noise of the differential amplifier(s). By using a series diode or multiple diodes connected to each differential pair emitter, noise caused by series base resistors and/or collector shot noise sources from emitter to collector of each differential pair transistor is reduced.

A diode pair or pairs preferably are used, and output distortion is substantially equal to that of a prior art multiplier circuit when the control voltage at the bases is varied. The reason is that the upper differential pair (output) transistors and the added diodes each have essentially the same (equivalent) bulk emitter series resistance.

It is known that for varying control voltages, there exists a small amount of output distortion in conventional differential pair voltage controlled amplifiers such as the LM 1496 of previous mention. This distortion is caused by equivalent series emitter resistors and/or the internal base series resistors in the upper differential pair transistors. However, as is disclosed by the invention, this distortion can be reduced by adding series-parallel diodes to the emitters. The reason for distortion reduction is because the added series-parallel combinations of diodes dilute the non linearity effect of the series emitter resistors of the upper differential pair transistors.

That is, noise and/or distortion in differential pair voltage controlled amplifiers may be reduced by adding "N" sets of "M" paralleled diodes in series with the amplifier's emitters, or by paralleling "M" sets of "N" serial diode strings in series with the emitters.

The invention contemplates that more noise reduction is achieved by using more than one diode in series with each emitter, as illustrated in FIG. 2A below. In general, use of these diodes allows for the reduction of internal transistor noise at the output of the collector(s), but also for reduction of external noise that may be part of the control voltage, Vcontrol. For example, external noise added to Vcontrol (i.e., via crosstalk of other signals on the circuit board) results in spurious noise and/or modulation noise at the output. Use of the diode feedback elements of the invention changes the transfer function of the control voltage input port and causes a shallower slope in the transfer function of the Vcontrol input versus output signal. Thus, when compared to prior art circuits, the invention provides a circuit of larger control voltage range along with noise reduction, as is illustrated in the discussion of FIG. 2A below.

By using multiple diodes for local feedback, and feeding the signal current through the diodes, a lower noise voltage controlled amplifier is achieved while maintaining low (or original) distortion, as the control voltage is varied. The use of diodes in series with the emitter of the differential amplifier also results in a larger control range and/or more linear voltage range than is provided by prior art circuits.

In a prior art circuit such as shown in FIG. 1B, if perfect transistors were used, there would be no distortion of the signal current (i.e., Isig) when the control voltage is varied. A perfect transistor would have zero ohm internal series base resistance and zero ohm internal series (bulk) emitter resistance. But as previously mentioned, most transistors have finite series internal base and/or internal emitter resistance, which then will cause distortion in a voltage control amplifier when the control voltage is varied.

One distortion component in a typical voltage controlled amplifier occurs when the input signal, part of the "tail" current, is set via the control voltage for other than 50% output (i.e., 0 volt across the bases of the upper transistors) or 100% output. This output distortion (i.e., harmonic distortion) arises from the differential amplifier's transistor internal equivalent emitter series resistance, EESR. Resistance EESR is also determined here by the emitter series bulk resistance plus the total series base resistance divided by the current gain, beta, of the transistor, where beta is considered large. The larger the EESR, the greater the distortion when a control voltage is set for other than 50% or 100% output, for example, when Vcontrol is set for 30% output of the signal from the tail current. Thus the invention described below provides a reduction in the output distortion of a voltage control amplifier which is caused by the resistance EESR. It should be noted that this type of distortion is aggravated further when the operating currents are increased. A circuit such as an LM 1496 which fails to include the emitter series diodes coupled to the upper (output) transistors of the voltage controlled amplifier in accordance with the invention does exhibit this type of distortion.

It should also be noted that in a configuration of the invention with many paralleled diodes in series such as the M pairs paralleled in, for example, FIG. 2F, distortion reduction occurs to the point where even equivalent series emitter resistances of the differential pair transistors become less of a factor in causing distortion.

It follows that in one embodiment of this invention, a way to insure even lower output distortion when the control voltage is set, is to parallel each diode with more diodes. This paralleling of diodes to form a series-parallel connection of diodes reduces the (distortion) effect of series bulk or loss resistance in each diode or differential amplifier transistor. By reducing the effects of series bulk resistance, paralleled diodes become closer to the ideal diode in terms of the exponential Ebers-Moll equation for diode current versus diode voltage. And theoretically if the diodes and/or transistors of the differential pair follow the Ebers-Moll equation, the distortion is zero when the control voltage is varied for bipolar transistors. Of course if a diode is already close to the ideal, paralleling the diodes is not required.

An alternative method of reducing internal and/or external noise may be done at the expense of increasing output distortion by replacing the diodes with resistors. But this method only allows for low distortion when the control voltage is set for a 50% even split of the signal current, or for 100% of signal current. At other proportions, the (external) series emitter resistors actually increase distortion such as that seen for example in a prior art voltage controlled amplifier. However, in this invention, a method of feeding some of the output of the voltage controlled amplifier back to a control input reduces the distortion, thus allowing for a lower noise voltage controlled amplifier or multiplier with low distortion.

It should be noted that in the preferred embodiments, generally a nonlinear element or elements are placed in the transistor or transistors that form the upper output of the multiplier (mixer) or voltage controlled amplifier. But in another embodiment, external series resistors are added to the upper output differential pair as a way of reducing noise. However, in this latter instance, a linearizing circuit is required to reduce the distortion caused by the added emitter series resistance.

Another embodiment of the present invention reduces the distortion in single ended amplifiers by adding at least a diode in series with the emitter while maintaining a wide range of gain control.

Yet another embodiment of the present invention linearizes the control input of the multiplier using multiple diode techniques.

DETAILED DESCRIPTION OF THE INVENTION

Figure 1B:
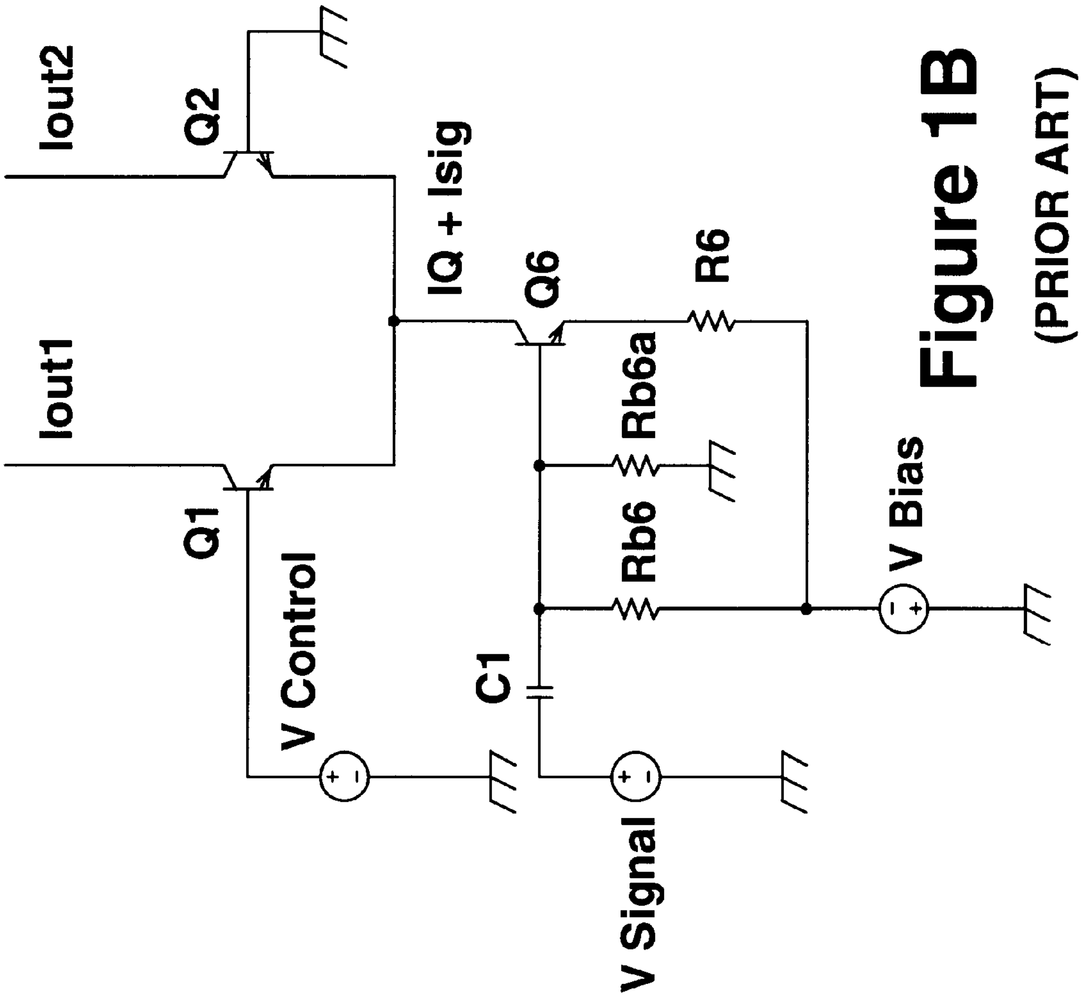
Figure 1B (PRIOR ART)
FIG. 1B is a schematic diagram which illustrates a simple but commonly used differential amplifier with Vsignal superimposed as the emitter current source so as to form a voltage controlled amplifier. Note that the internal base resistors, Rbbx's, are in the transistors but are not depicted externally for schematic simplification.
Figure 1A:
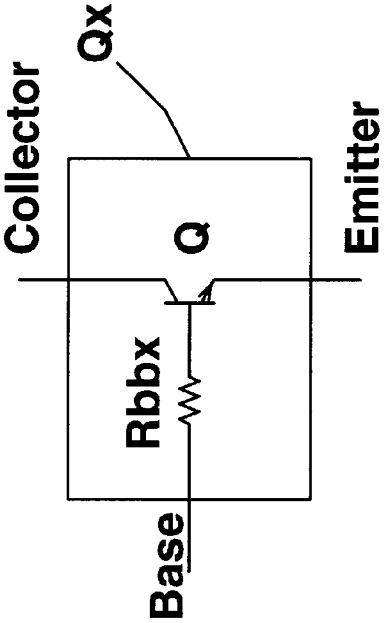
Figure 1A (PRIOR ART)
FIG. 1A is a schematic diagram which illustrates the internal series base resistor, Rbbx, for a prior art transistor Q, which exemplifies the internal base series resistance present in all transistors. Qx then represents a transistor Q with a series base resistance, Rbbx.

Referring now to the drawings, FIG. 1A depicts a transistor, Qx, including a usual internal base series resistance Rbbx. Transistor Qx is representative of the types of real world transistors produced today. In the subsequent figures, the resistance Rbbx is assumed to be built into each transistor.

Figure 1C:
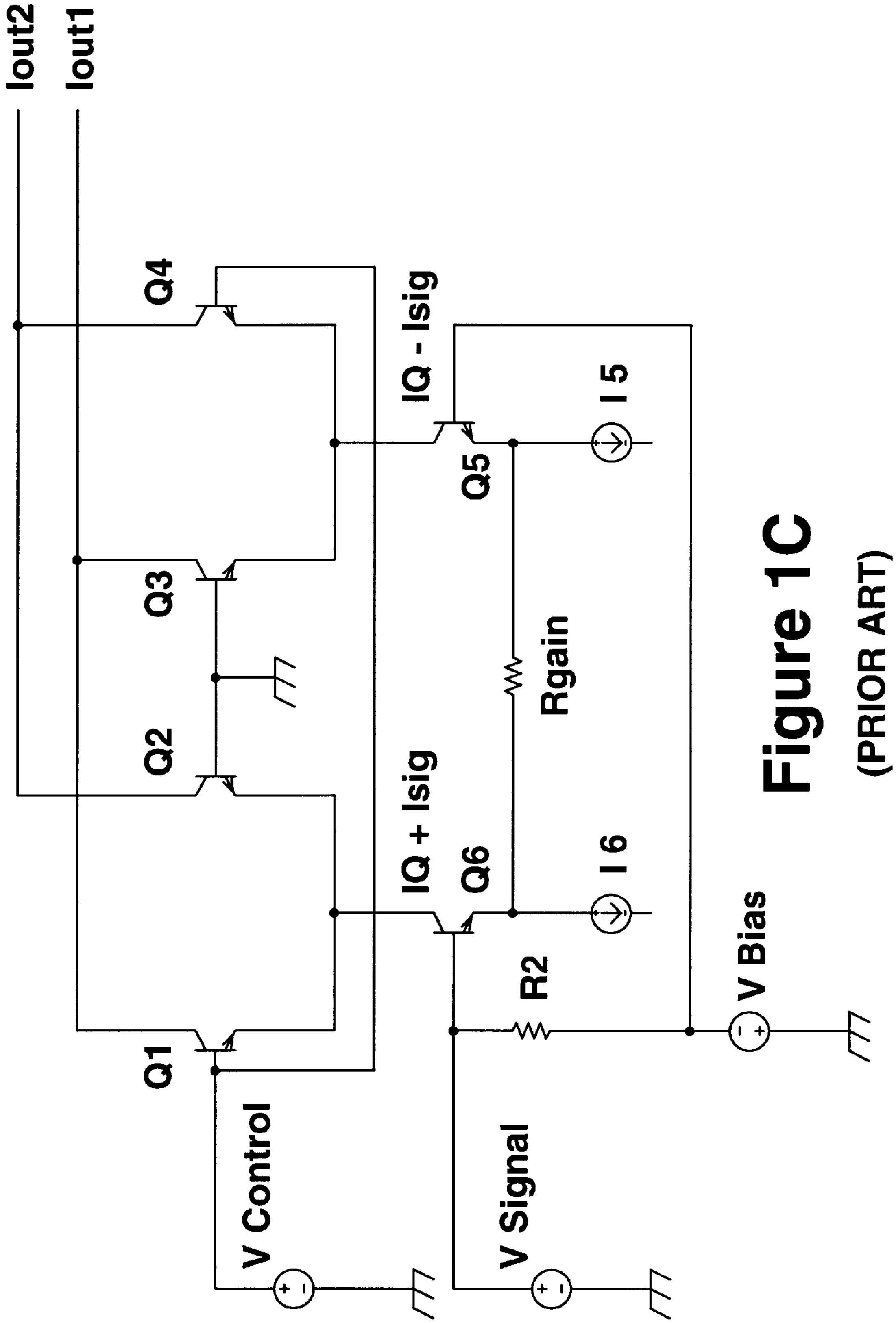
Figure 1C (PRIOR ART)
FIG. 1C is a schematic diagram which illustrates a prior art multiplier or mixer circuit similar to an LM 1496. For ease of illustration the internal series base resistors (Rbbx's) are not depicted externally.
Figure 1D:
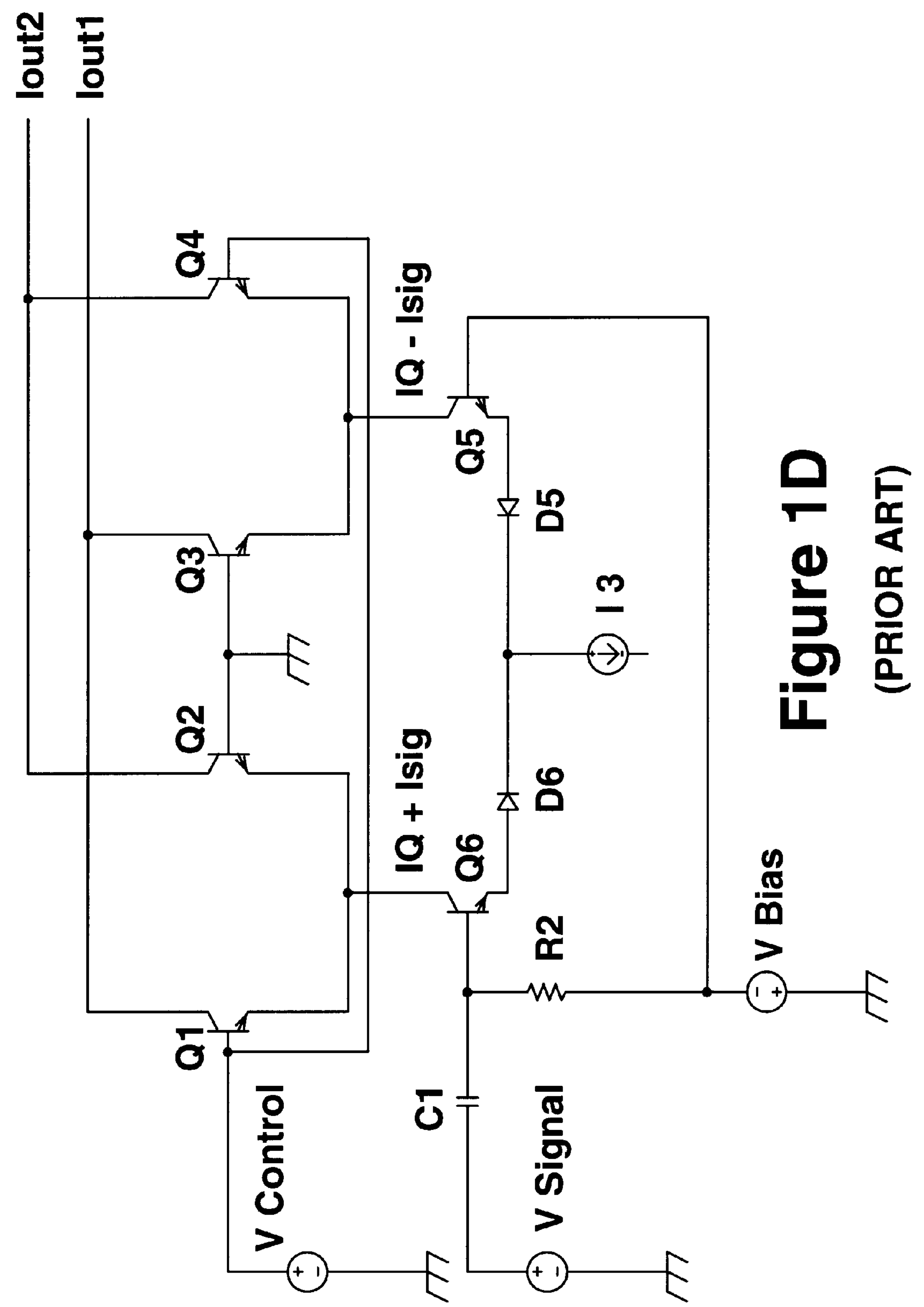
Figure 1D (PRIOR ART)
FIG. 1D is a schematic diagram which illustrates yet another prior art multiplier circuit, part of a radio circuit LM 1863. Note that there are local feedback diodes in the lower differential pair of transistors but no local feedback diodes are connected to the upper pair of output transistors.

FIGS. 1B, 1C, and 1D are examples of a prior art voltage gain amplifier, a LM 1496 type balanced mixer, and a balanced mixer found in an LM 1863, respectively. In all three of these circuits, the signal current Isig is controlled by the upper output transistors, Q1 and Q2, or Q1 through Q4. All three circuits suffer noise problems that can limit signal to noise ratio, SNR, in, for example, a high quality audio system. For instance, in a similar device, MC 1495, the maximum SNR is about 75 dB. The techniques in accordance with the invention generally results in SNR>80 dB.

The operation of the circuit of FIG. 1B can be described as follows: Upper control or modulating output transistors, Q1 and Q2 control the signal current from the lower signal transistor, Q6. By applying a voltage differential to the bases of Q1 and Q2, the signal transfer to an output (such as Iout1 or Iout2) is controlled from 100% to 0%. In general, the output of this amplifier can be the collector current of one of the output transistors, for instance, Q1. The general output signal equation then is, Iout1=[IQ+Isig]exp (v/VT)/[1+exp (v/VT)], where IQ is the DC quiescent current, Isig is the signal current, v is the voltage across the bases of the output transistors, VT=0.026 volt at room temperature, and exp (v/VT) is the number e raised to the (v/VT) power, (e=2.718281828). Or in general, exp x here is defined as: e raised to the xth power.

The internal base resistances in Q1 and Q2, are sources of random noise as are shot noise current generators across the collector and emitter of Q1 and Q2. One way to reduce the noise at the output (i.e., Q1 or Q2 collector) of the voltage controlled amplifier is to place local feedback elements in series with the upper output transistors, Q1 and Q2, in accordance with the invention in FIGS. 2A, 2B, 2D, etc.

Figure 2C:
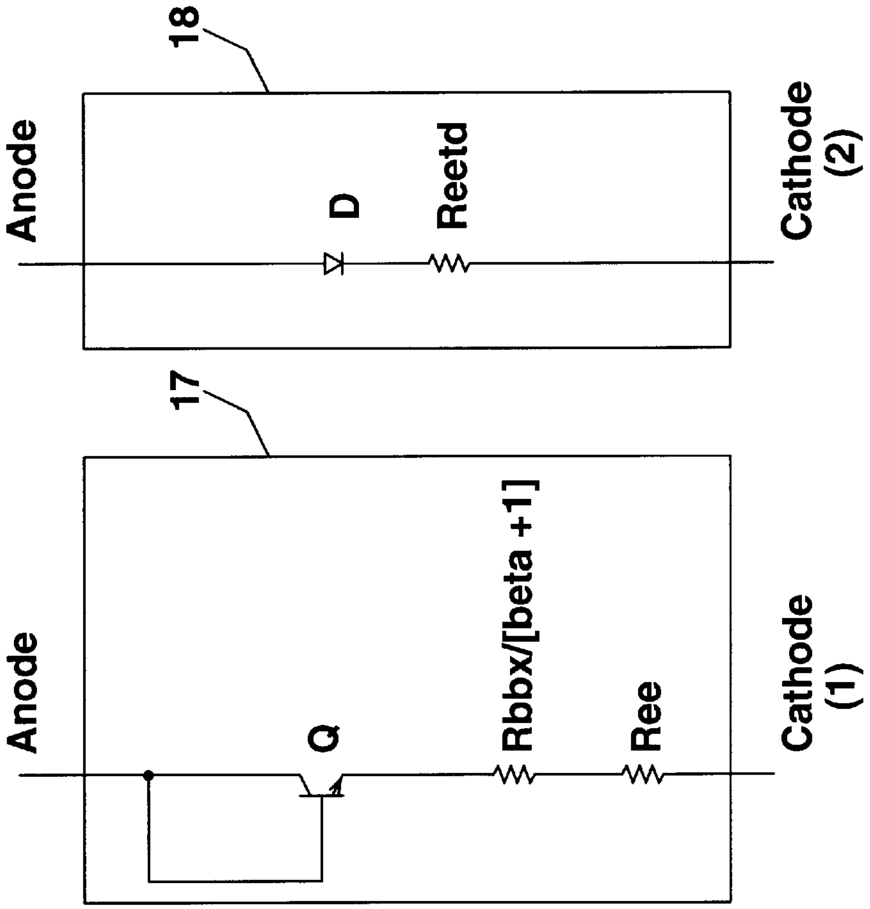
Figure 2C (PRIOR ART)
FIGS. 2C(1) and 2C(2) are schematic diagrams which illustrate a model for a transistor connected as a diode with emitter series resistances, and a model for a diode with finite series resistance, respectively.
Figure 2A:
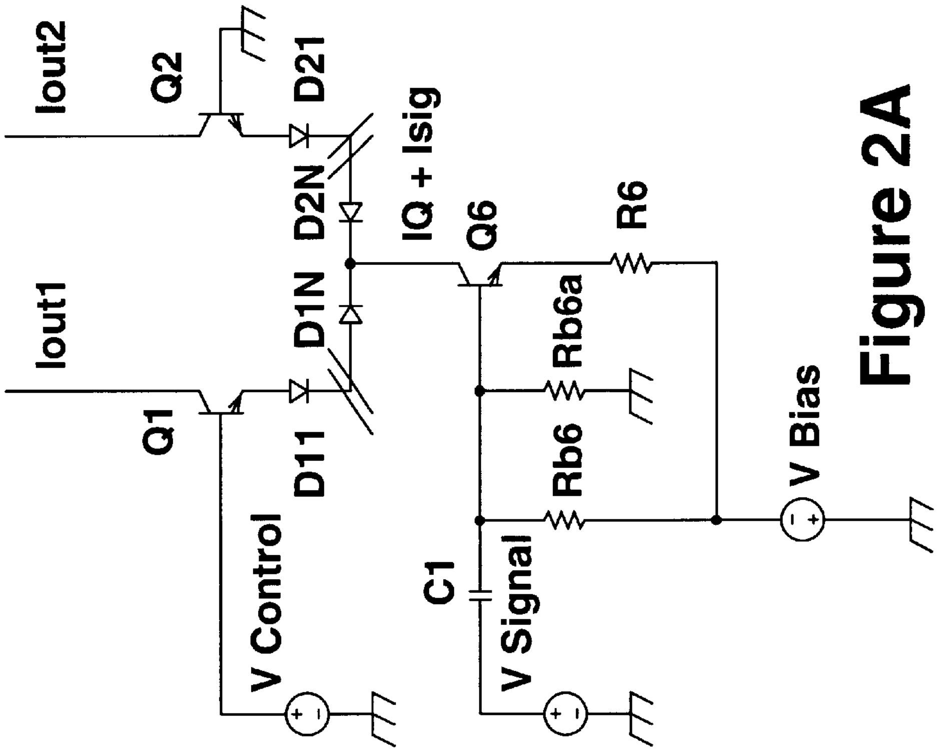
FIG. 2A is a schematic diagram which illustrates an embodiment of the invention where "N" pair(s) of diodes are connected in series to the emitters of the upper control or modulating (output) transistors. Note that FIG. 2A is an implementation of the invention for improving the prior art circuit of FIG. 1B by lowering the output noise while maintaining the prior art distortion.

FIG. 2A illustrates an embodiment of the invention for lowering noise at the output of a voltage controlled amplifier, multiplier or mixer circuit, by adding local feedback elements consisting of at least a series diode pair, or series diode pairs. In FIG. 2A the output current Iout1=[IQ+Isig]exp(v/(N+1)VT)/[1+exp(v/(N+1)VT)]. As may be observed, this new relationship with N diode pairs also results in a greater control voltage range (including a greater linear control range) which also has a benefit of more immunity (at the output, Iout) to extraneous noise from external sources, such as noise mixed in with the control voltage. The greater the number of diode pairs added in series, the greater the amount of noise reduction obtained. For example, N, where N=the number of diode pairs, can be 1 or 2, or more than 2, depending on the amount of noise reduction desired.

It also should be noted that generally the lower signal transistor, Q6, of for example FIG. 2A, coupled to the upper output transistors, already has some type of feedback element, R6, for reducing its output collector current noise.

Figure 2B:
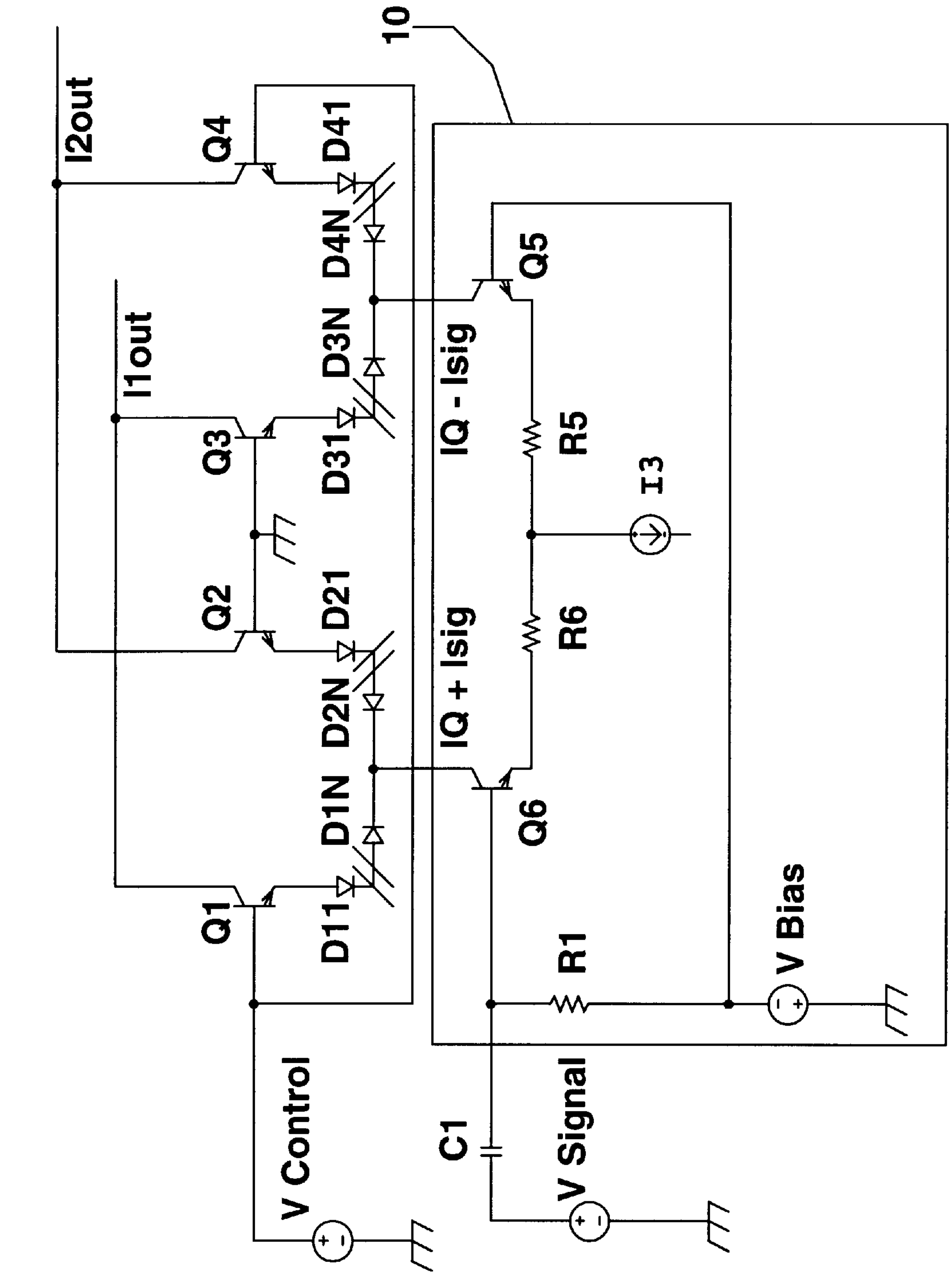
FIG. 2B is a schematic diagram which illustrates another embodiment of the invention wherein a diode pair or diode pairs are used to improve the prior art circuit shown in FIG. 1C.

In the case of a balanced multiplier such as shown in FIG. 1C, noise from series base resistors and/or shot noise generators of transistors Q1, Q2, Q3, and Q4 is reduced in accordance with the invention by inserting local feedback elements in a series of diodes (for example, N=n) as illustrated in FIG. 2B. Again here the control voltage range transfer function similarly is extended as described in the equation above for Iout1. It follows that the control voltage input at the bases of upper output transistors Q1 to Q4, has more immunity to outside noise sources along with greater linear control voltage range.

A circuit 10 in FIG. 2B represents a differential amplifier for one of the inputs, Vsignal, with push-pull collector outputs from Q6 and Q5. Here, Vsignal is converted to signal currents, Isig and −Isig. IQ is the quiescent collector current of Q5 or Q6.

It should be noted that because of these nonlinear local feedback elements, the control input also has greater dynamic range and thus lower distortion for a fixed (given) level input AC signal when compared to prior art circuits such as that of FIG. 1C. This low distortion feature is important should the embodiment of FIG. 2B be used as a sine wave mixer, that is, if Vcontrol is a sine wave signal source. For example if Vcontrol is a sine wave source of about 300 millivolts (mv) peak to peak, the prior art circuit of for example FIG. 1B (or 1C) will have the upper output differential amplifiers going into limiting (sine wave is starting to clip), whereas the same Vcontrol signal level for the embodiment of FIGS. 2 (or 2B) with N>=1 will exhibit less limiting on the upper output transistors, in accordance with the invention. It is to be understood that Vcontrol can be a signal other than those mentioned here.

FIG. 2C(1) illustrates a circuit 17 as a practical transistor consisting of transistor, Q, connected as a diode with series resistances Rbbx/[beta+1] and Ree. If the beta of Q is reasonably large, then Rbbx/[beta+1]=Rbbx/beta. Circuit 18 of FIG. 2C(2) illustrates a "practical" diode as a diode, D, with a series resistance of Reetd. Reetd is the equivalent series resistance of diode, D, and can be equal to Ree or can be equal to Reet.

Figure 2F:
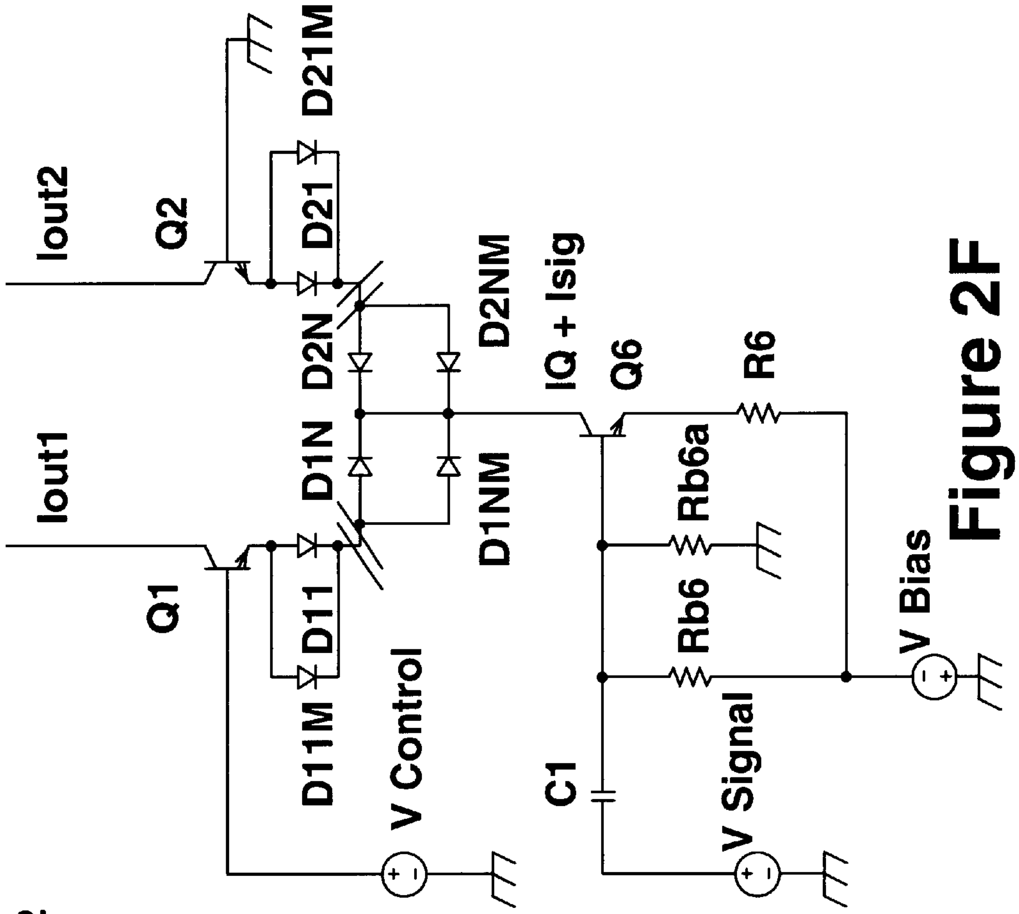
FIG. 2F is a schematic diagram which illustrates a more general version of the invention wherein non linear elements consisting of paralleled elements (i.e., parallel diodes) are placed in series with differential pair transistors to lower noise and/or distortion.
Figure 2D:
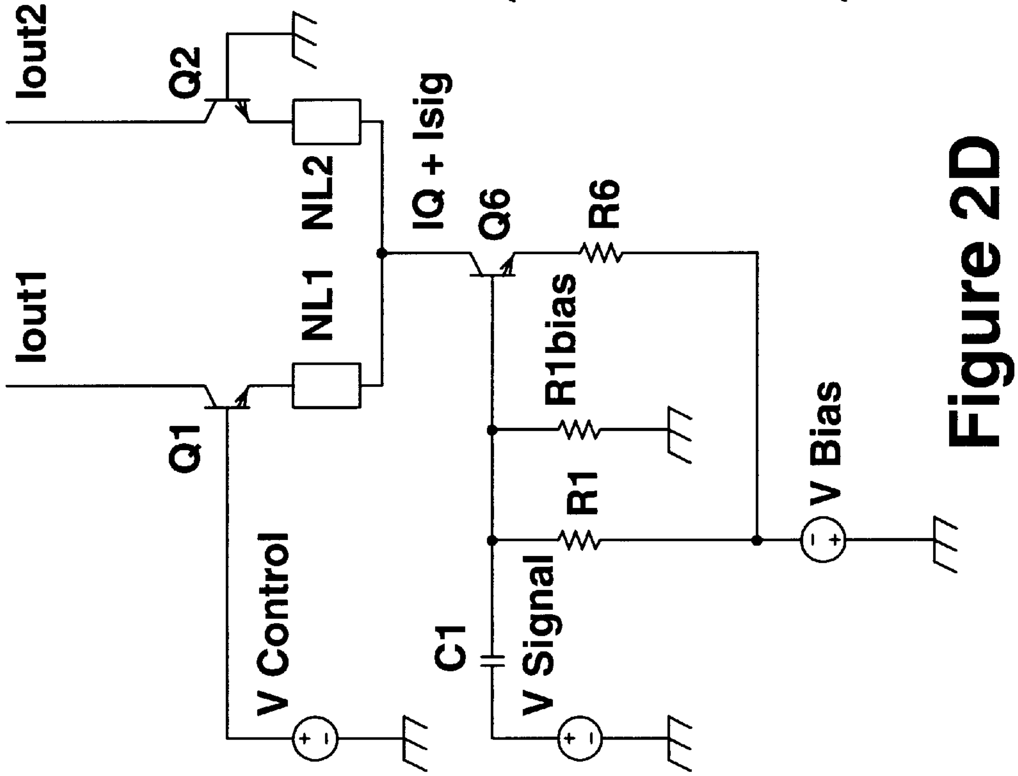
FIG. 2D is a schematic diagram which illustrates a more general version of the invention wherein non linear elements, NL1 and NL2, illustrate implementing the invention with a transistor pair.

FIG. 2D is a general illustration of a voltage controlled amplifier modified with local feedback elements NL1 and/or NL2 which can be made up of nonlinear and/or linear devices. For now, assume that these elements are nonlinear such as series diodes or the like.

Figure 2E:
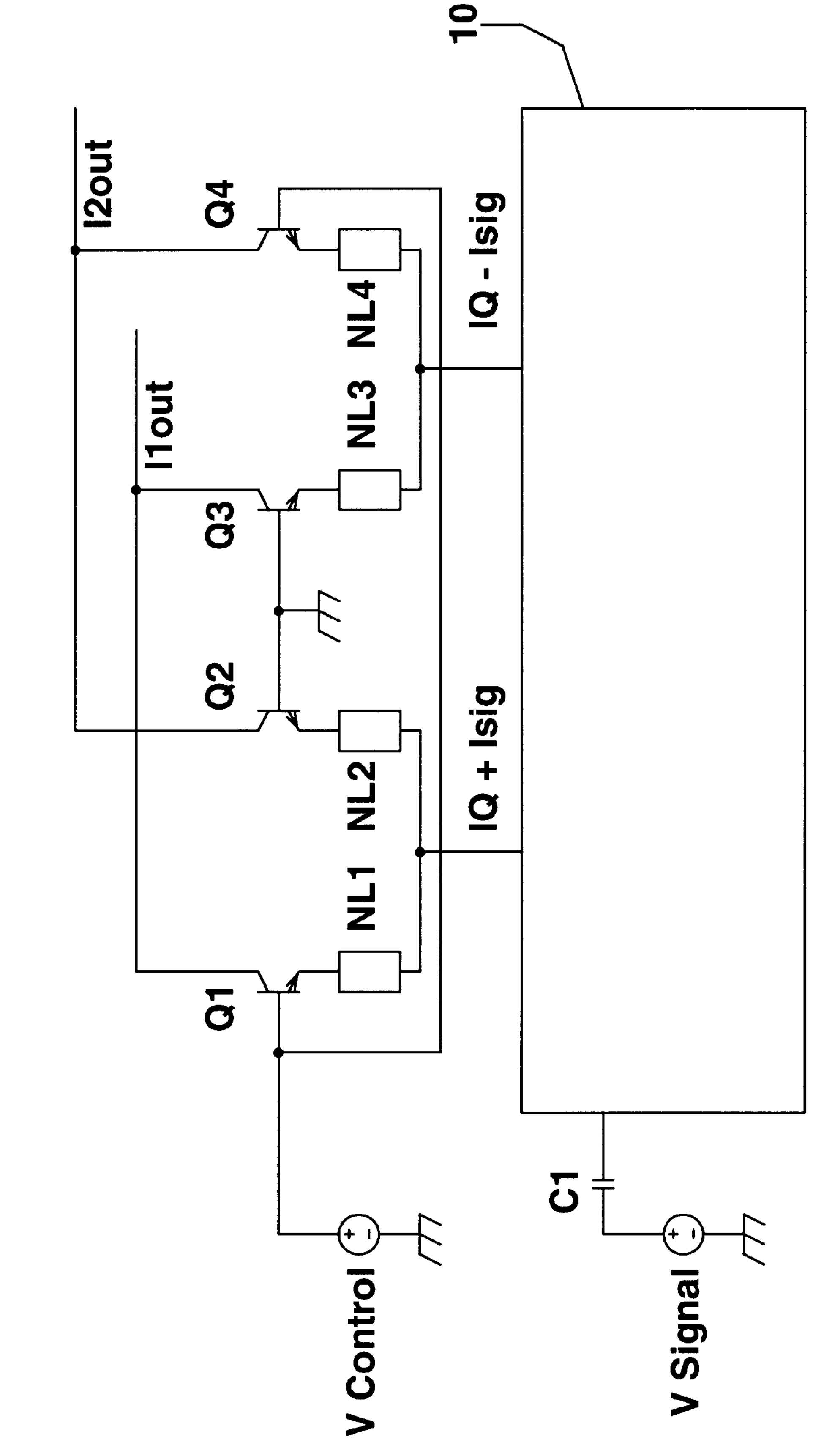
FIG. 2E is a schematic diagram which illustrates a more general version of the invention when applied to a prior art circuit such as an LM 1496 type circuit.

Similarly, FIG. 2E is a general illustration of an analog multiplier modified with local feedback elements NL1, NL2, NL3, and NL4, wherein these four local feedback elements may consist of nonlinear and/or linear elements. For now, assume that NL1 to NL4 are nonlinear such as series diodes or the like.

Referring to the embodiment of FIG. 2F, paralleling nonlinear devices in the local feedback system of the upper output transistors will further reduce distortion (i.e., harmonic distortion) of the signal current, Isig at the output. The reason is, as discussed previously, that all transistors exhibit a finite series base resistance and/or series emitter resistance within the transistor. The higher the equivalent series emitter resistance in a transistor, the higher the output distortion at Iout for the signal current Isig when controlling the input with a Vcontrol signal that is set at other than 100% or 50% output. (The series base resistance, Rbb, can be combined with the series emitter resistance, Ree, to define a total equivalent series emitter resistance, Reet=[Rbb/beta]+Ree.) By paralleling devices in the upper portion of the voltage controlled amplifier or balanced mixer, the equivalent Reet is reduced in value. In the local feedback loop where transistors are connected as diodes, each of these diode connected transistors has an equivalent Ree series resistor. By paralleling these diodes with diodes, and/or using larger geometry devices for transistors connected as diodes, the diode's Ree is then reduced in value. In accordance with the invention, the lower the total Ree or Reet, the lower the distortion at the output for the input signal current Isig.

Also, quiescent current, IQ, has a role in the distortion as well. Ideally for lowest distortion, 1/gm>>Ree (or Reet) where gm is the transconductance of an upper output transistor (i.e., Q1 or Q2). Since gm is increased with increased DC collector current, as IQ is increased, 1/gm is decreased, whereby 1/gm is not much larger than Ree, which leads to more distortion.

By way of example, assume there are two series diodes (i.e., N=2) for each upper output transistor in the local feedback system in FIG. 2A. And assume that each diode connected transistor has an equivalent Ree or Reet of 1 ohm. This means that the diodes in series with Q1 will have an equivalent resistance of 2 ohms added to the Reet of Q1. Now if each diode has been paralleled with another diode, the new series Ree of each paralleled diode combination drops to 0.5, yielding 1 ohm total Ree for the parallel-series diodes added to the equivalent Ree of Q1. By using larger area diodes or paralleled diodes, the overall distortion on Isig at the output (i.e., Iout1), caused by lowered resistance of Ree or Reet, is reduced. See FIG. 2F. Paralleling of diodes may be applied to the local feedback diodes as illustrated in FIG. 2B to further lower output distortion.

By way of summarization:

An increase in the number of series diodes connected to the upper output transistors' emitters of a voltage controlled amplifier or mixer results in additional output noise reduction.

An increase in the number of series diodes connected to the upper output transistors' emitters of a voltage controlled amplifier results in a greater control range voltage or in a greater linear control range, thereby providing less sensitivity to external noise.

An increase in the number of diodes connected in parallel to each series diode results in a more distortion free output of the input signal current.

Linear resistances may be used in place of the diodes to reduce noise. For example, it is possible to reduce output noise by using emitter degeneration resistors. See FIG. 3, RE1 and RE2. However, use of these substantially linear devices will actually cause more distortion of the input current (i.e., Isig) to appear at the output.

However, this "Ree" type distortion may be reduced by simply adding to the control voltage a portion of the output collector current of each transistor times a resistance. For instance, if the external emitter degeneration resistors are 52 ohms each, a voltage of (Ic1−Ic2) 52 is added to the control voltage Vcontrol to allow for an output reduced in Isig distortion.

In general for an amplifier containing both diodes and resistors the following equation applies. Vcontrol=(N+1) VT 1n (Ic1/Ic2)+(Ic1−Ic2)Re, where N is the number of diode pairs, and Re is the emitter degeneration resistance, or can be the total resistance comprising Ree (equivalent internal series emitter and/or diode resistances) plus the external emitter resistance. From this equation, to null out the distortion, a new control voltage, Vcontrol'=Vcontrol+(Ic1−Ic2)Re may be derived. In a situation wherein a prior art VCA experiences an increase in distortion due to the addition of external resistance to the emitters to lower output noise, this method is applicable in accordance with the invention to reduce the increase in distortion by then coupling a portion of the output back to the control input to re-lower the distortion.

The example above provides a reduction in the distortion of Isig by using collector load resistors equal to Re and taking the differential output from the collector load resistors to sum with the control input voltage.

Figure 4A:
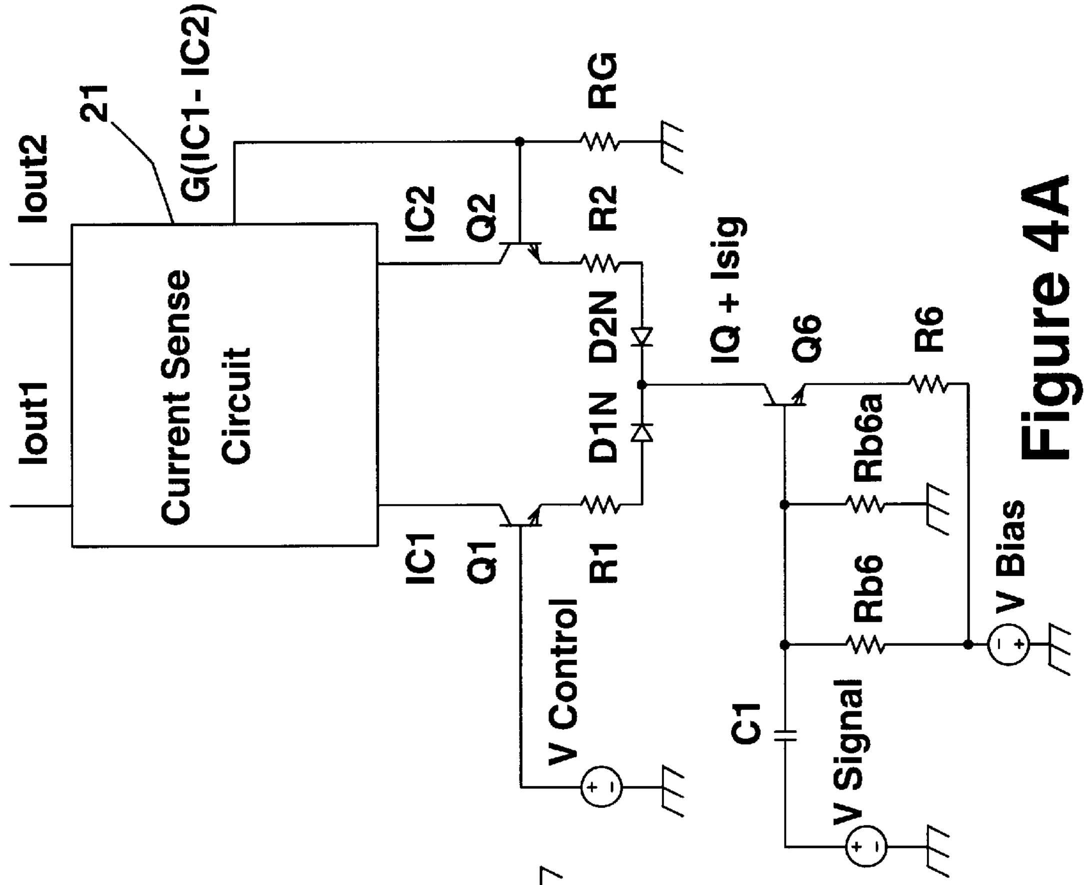
FIG. 4A is a schematic diagram which illustrates another alternative embodiment for reducing distortion by feeding a portion of the amplifier's output back to a control input. This amplifier then allows for reduction in noise and in further reduction in distortion.

FIG. 4A illustrates an embodiment of the invention where the external emitter resistors are R1 and R2. Although external series diodes are also shown as D1N and D2N (where N=number of series connected diodes), these diodes may be removed, leaving only the external emitter resistors. Here circuit 21 is used to sense the differential current of Q1 and Q2. An output of 21 is G(1C1−1C2), and this output is fed back to the base of Q2. In this example, given R1=R2, then RG=R1 and G=−1. Vcontrol is used to control the amount of (signal) current from the collector of Q6. This circuit results in lowered noise from Q1 and Q2 due to the use of R1 and R2 as feedback elements, and also has a distortion reducing circuit, 21, for lowering distortion caused by the added external resistors R1 and/or R2.

Figure 4B:
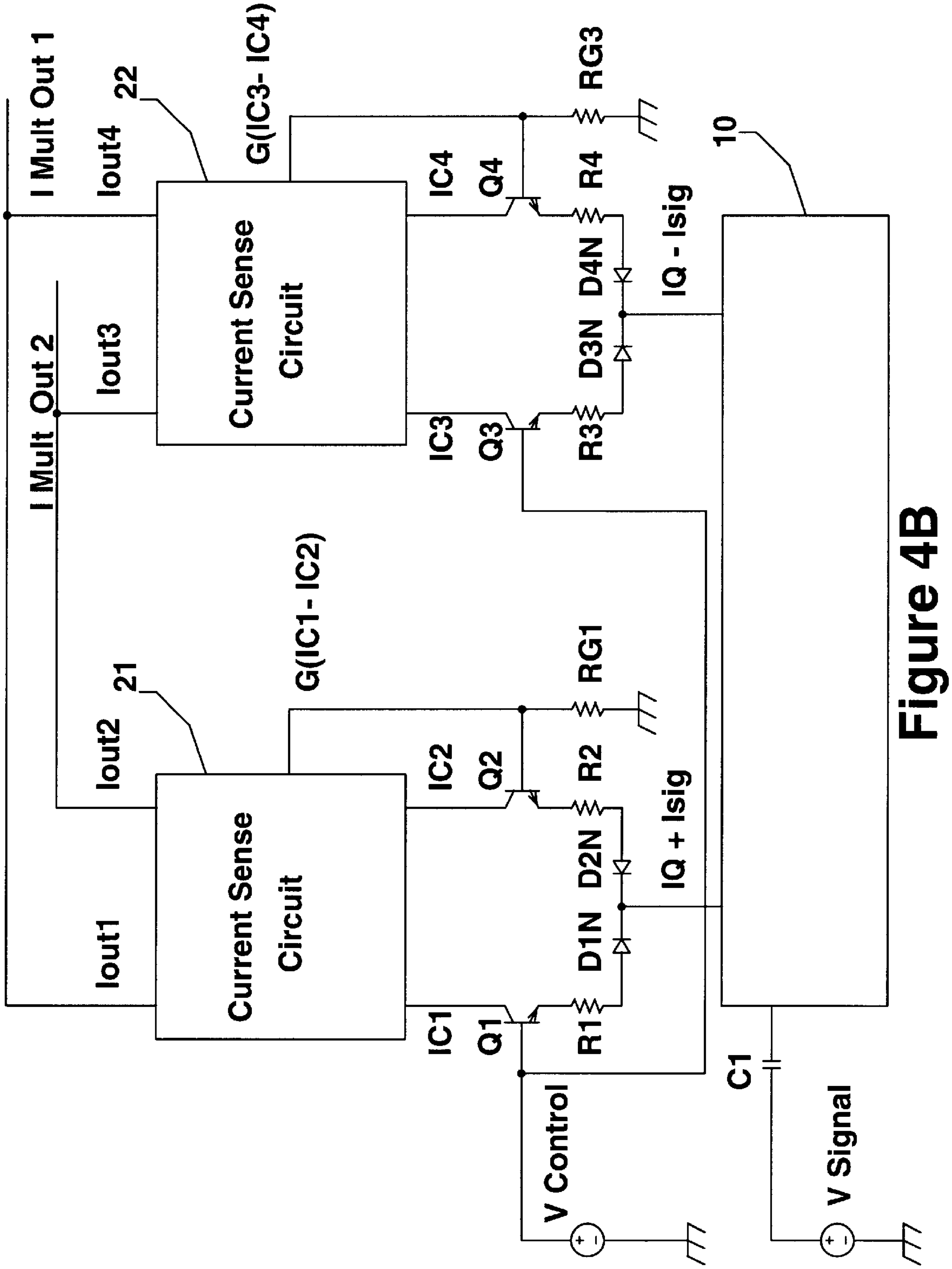
FIG. 4B is a schematic diagram which illustrates another alternative embodiment for reducing distortion via a circuit similar to the circuit in FIG. 4A, but now in a balanced multiplier configuration wherein external emitter resistors have been added.

Similarly, FIG. 4B illustrates a circuit similar to that of FIG. 4A except the embodiment of FIG. 4B is connected as a balanced multiplier. A circuit 22 is substantially the same as the circuit 21 of FIG. 4A. As can be seen here, outputs Iout1 and Iout2 of circuit 21 are connected to the outputs Iout4 and Iout3 respectively of circuit 22. Circuit 10 is similar to circuit 10 of FIG. 2E, and comprises an amplifier circuit with differential outputs and an input Vsignal. Thus Vcontrol is used to control signals generated by Vsignal in a reduced noise and/or reduced distortion manner.

Figure 4C:
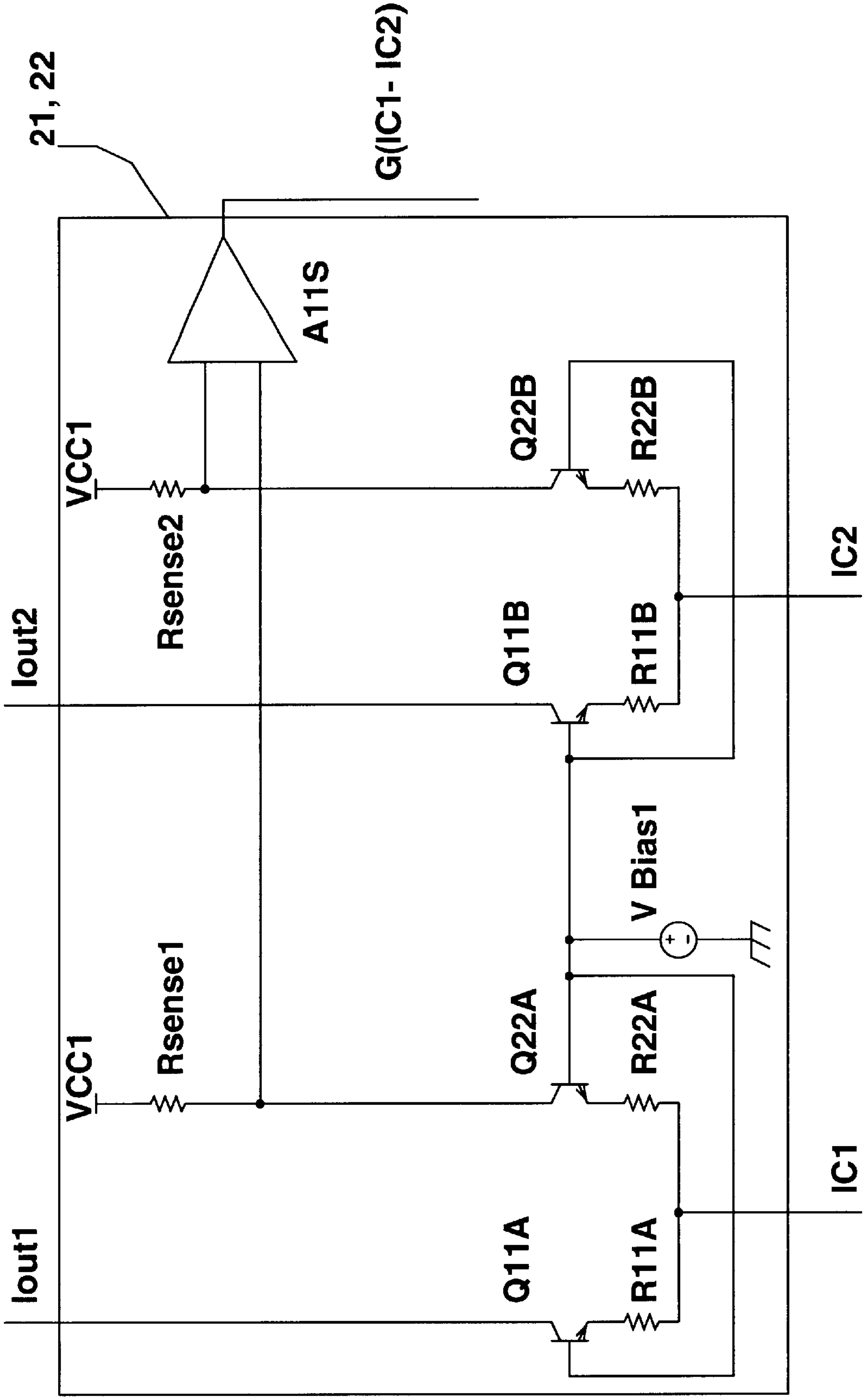
FIG. 4C is a schematic diagram which illustrates an implementation of a current sense circuit 21 or 22.

FIG. 4C illustrates an example of the circuit 21 or 22. In this example, R11A, R22A, R11B, and R22B are all resistors. However R11A, R22A, R11B, and R22B each can be replaced with some combination of series connected diode (s) and/or resistors (see R1 and D1N in FIG. 4A). But for this example, the use of the four resistors is assumed having a chosen resistance of for example R11A, R11B, R22A and R22B=1000 ohms for IQ=1.0 milliamp which allows Q11A, Q22A, Q11B, and Q22B to not contribute significant noise to the overall mixer or multiplier. Because the bases of these four transistors are biased to the same voltage, each transistor receives a 50% split of IC1 and/or IC2. This 50% signal division does not increase the distortion of Isig to the mixer or multiplier output.

In FIG. 4C, the transistors Q11A and Q11B provide a signal output for the multiplier while transistors Q22A and Q22B provide outputs for feeding back with the control voltage, Vcontrol. See FIG. 4A or 4B. The collectors of Q22A and Q22B are coupled to load resistors Rsense1 and Rsense2. A differential amplifier A11S takes the difference voltage between these two load resistors and outputs a signal back to the base(s) of Q2 and/or Q4 in FIG. 4A or 4B. For this example and because of a 50% split in signal current, Rsense1=Rsense2=2R1=2R2=2R3=2R4. Note R1 to R4 are shown in FIG. 4B. A11S then converts the differential voltage across Rsense1 and Rsense2 into a current output of −1(IC1−IC2). RG1 and RG3, FIG. 4B, are now set to the same resistance as R1 to allow for cancellation or reduction of distortion of the signal when Vcontrol is varied.

It should be noted in circuits 21 and/or 22 of FIGS. 4A–4C that amplifier A11S may be a voltage (source) output amplifier having an output=[G'(IC1−IC2) Rsense1]. In this example, resistor RG is optional, and the voltage output of A11S is coupled to the bases of Q2 and/or Q4 of FIG. 4B.

To summarize this latter portion of the invention, a differential pair voltage controlled amplifier with local feed back elements can have a portion of its output or outputs combined with the control voltage to reduce distortion at the output.

Figure 5:
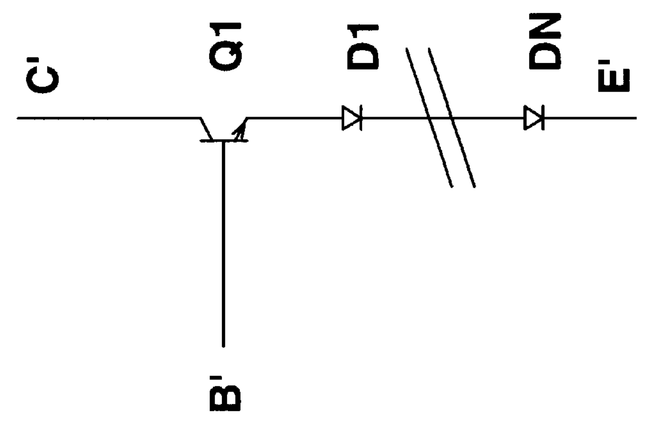
FIG. 5 is a schematic diagram which illustrates an alternative embodiment of a single ended amplifier with nonlinear element(s) for reducing distortion.

FIG. 5 depicts a circuit for lowering distortion in a single ended amplifier while retaining the gain control characteristics, by changing the collector current of Q1. The series diodes allow for greater dynamic range for a signal voltage drive between terminals B' and E'. A circuit as denoted in FIG. 5 is useful for radio circuits such as intermediate frequency (IF) amplifiers that require gain control.

Figure 3:
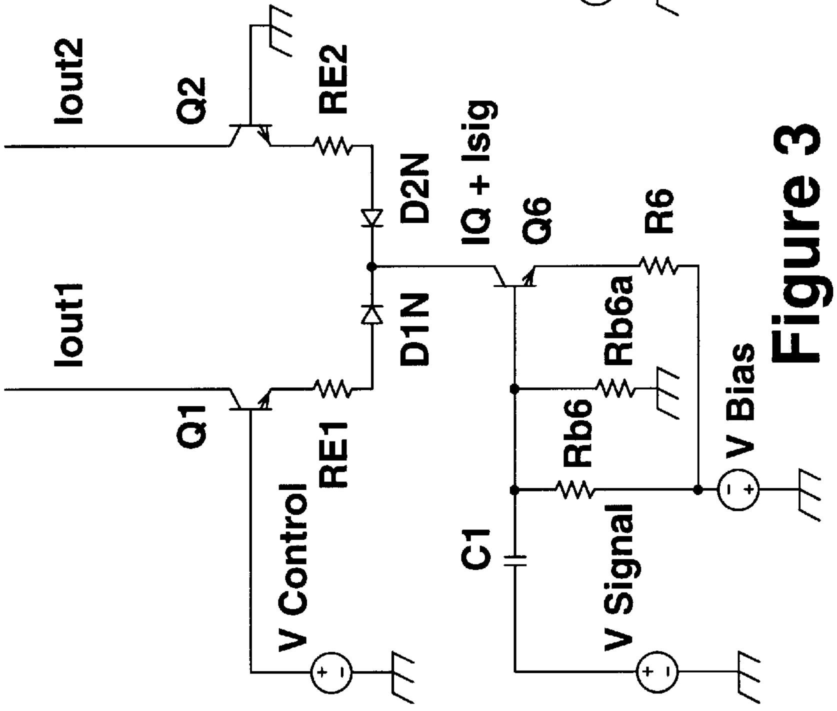
FIG. 3 is a schematic diagram which illustrates an alternative embodiment of the invention for lowering noise by using resistors.

Similarly, in FIG. 2A and/or FIG. 3, if Vsignal is set to zero or removed, and Vcontrol is now a signal source (i.e., an IF signal), and with N>=2, then a wide dynamic range amplifier is achieved with gain control via changing the collector current of Q6.

Figure 6A:
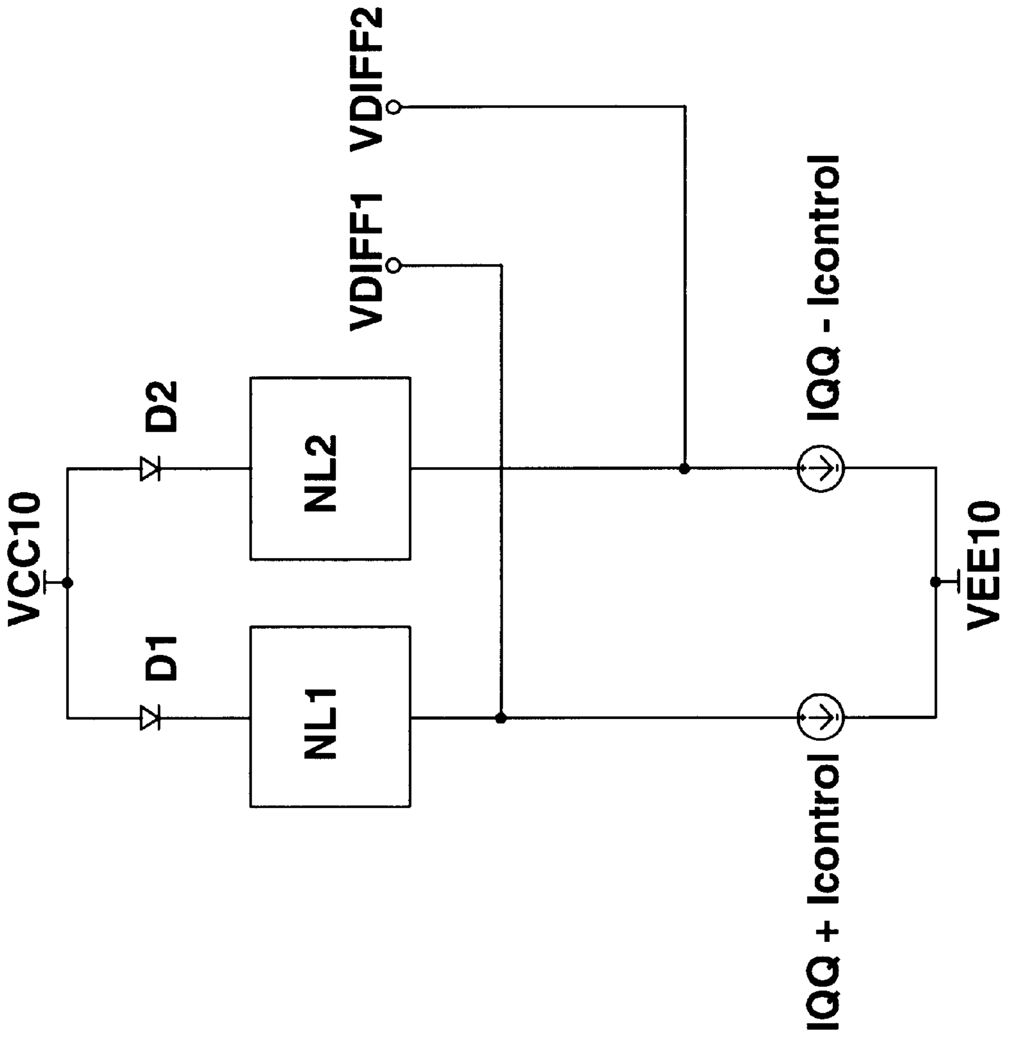
FIG. 6A is a schematic diagram which illustrates another alternative embodiment for linearizing the control input of a voltage controlled amplifier or mixer.

FIG. 6A illustrates an embodiment for linearizing the control input of circuits such as those in FIGS. 2A, 2B, 2D, and 2E. The control voltage Vcontrol is converted to signal currents in a push pull manner via two current sources IQQ+Icontrol and IQQ−Icontrol. A quiescent DC current is defined by IQQ. Each of these two current sources is coupled to a diode in series with a nonlinear element NL1 or NL2. As mentioned before, NL1 or NL2 are substantially the same elements used in the local feedback in circuits shown in FIGS. 2A, 2B, 2D or 2E. For example, with Vcontrol removed, and ground for the bases of Q2 and Q3 removed in the circuit illustrated in FIG. 2B, the output of FIG. 6A, VDIFF1 is coupled to the bases of Q1 and Q4 (FIG. 2B), and the output VDIFF2 is coupled to the bases of Q2 and Q3 (FIG. 2B). In this example, NL1=NL2=n diodes in series. Essentially the circuit in FIG. 6A can be considered a predistortion circuit for linearizing a hyperbolic tangent transfer function.

Figure 6B:
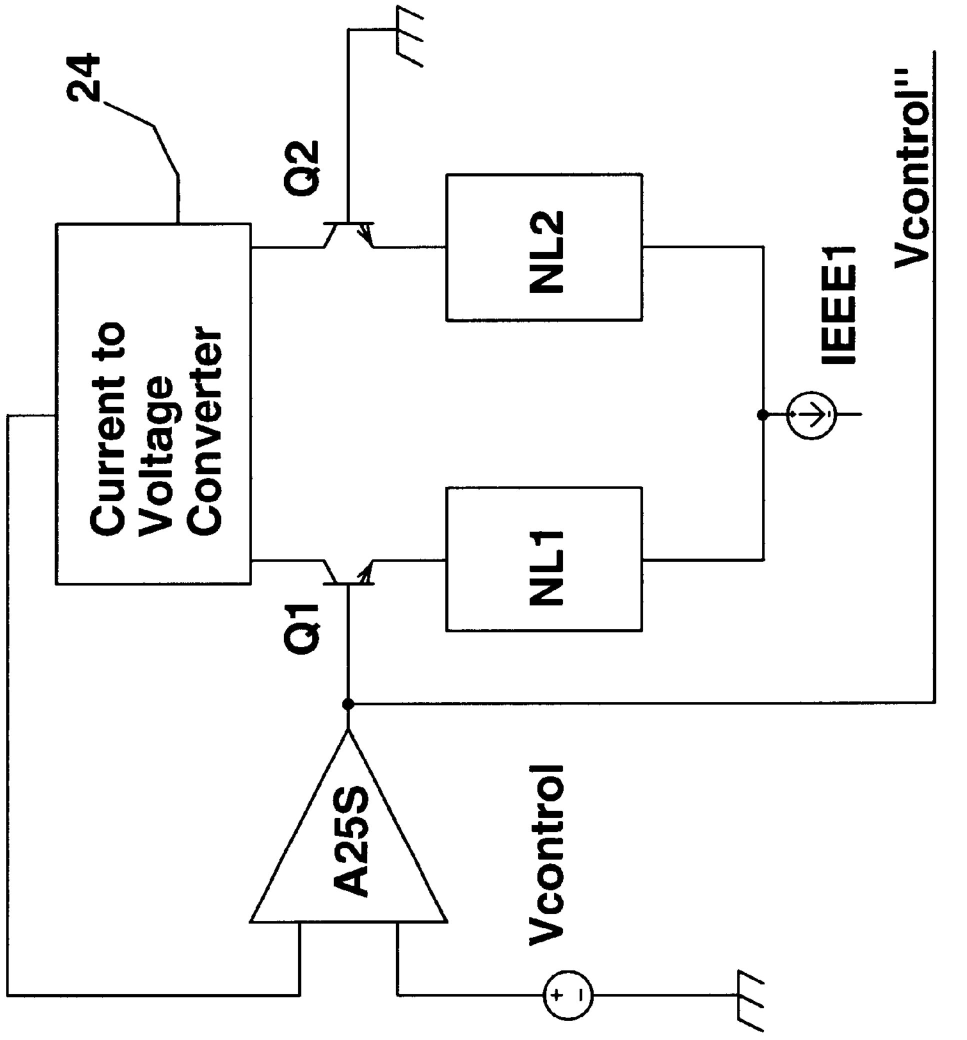
FIG. 6B is a schematic diagram which illustrates yet another alternative embodiment for linearizing the control input of a voltage controlled amplifier or mixer.

FIG. 6B illustrates a circuit which performs a similar function to the circuit of FIG. 6A, and depicts yet another technique for linearizing a transfer function of an input port of a voltage controlled amplifier or analog multiplier such as those illustrated in FIGS. 2A, 2B, 2D or 2E. This circuit is distinguished from U.S. Pat. No. 4,588,909 ('909) issued May 13, 1986 to Quan entitled "Distortion Compensating Circuit," in that the differential amplifier transistors (42 and 44) in patent '909 do not have local feedback elements, NL1 or NL2. Moreover NL1 or NL2 may be of nonlinear types such as a diode or series of diodes. In FIG. 6B, a differential amplifier with feedback elements is coupled to a current to voltage converter circuit, 24. The output of 24 is a voltage that is essentially the same as the input, Vcontrol, due to the gain of amplifier A25S and is coupled to an input of the differential amplifier. The output of amplifier A25S is then a predistorted signal which causes a linear transfer function into the differential amplifier comprised of Q1 and Q2, NL1 and NL2 and emitter tail current source IEEE1. Since the differential amplifier in FIG. 6B is substantially the same as the upper output differential amplifiers of FIGS. 2A, 2B, 2D or 2E, the output of A25S, Vcontrol", then is an output for linearization of the various circuits or embodiments in the present invention.

It is understood that the above are examples of the embodiments and other configurations that are contemplated by the invention. For instance, it is possible to use field effect transistors (FET) in FIG. 4A for transistors Q1 and Q2, along with N diode connected FET's (i.e., a diode connected n-channel FET may have the drain and gate connected for the anode and the source used as the cathode), and with optional resistors R1 and R2. In this case, a FET voltage controlled amplifier of lower noise as well as lower distortion is achieved. Circuit 21, FIGS. 4A–4C, which combines a portion of an output or outputs of the FET pair with the control voltage, will reduce distortion in the FET pair, including the FET pair with local feedback elements.

For example, even with perfect FETs for transistors Q1 and Q2 in the prior art circuit FIG. 1B, if there are no local feedback elements, there will be distortion of Isig in a circuit where the Vcontrol signal is set for an output other than 100% or 50%. So by using a circuit 21 to feed back a portion of the drain output (or outputs) in combination with the Vcontrol signal, distortion is reduced. It is also understood that Vcontrol can be another signal source.

Although the present invention has been described and illustrated in detail, it is clearly understood that the same is by way of illustration and example only and is not to be taken by way of limitation, the spirit and scope of the present invention being limited only by the terms of the appended claims and their equivalents.

What is claimed is:

1. A method of reducing the output noise generated by a gain controlled amplifier, analog mixer or multiplier circuit, wherein the circuit includes a pair of output transistors having an emitter, collector and base, comprising:

inserting one or more nonlinear element with local feedback in series with at least one of the output transistors; and applying a linearizing control voltage to at least one of the output transistors to linearize the control input of said circuit.

2. The method of claim 1 wherein the nonlinear element is inserted in series with the emitter of the output transistor.

3. The method of claim 1 wherein the output transistors comprise differential pair amplifiers, and a nonlinear element is inserted in series with each of the differential pair amplifiers.

4. The method of claim 1 including applying a control voltage to the base of at least one of the output transistors.

5. The method of claim 1 wherein the nonlinear element consists of a diode.

6. The method of claim 1 wherein the nonlinear element includes a linear element.

7. The method of claim 1 wherein the nonlinear element comprises at least two serially coupled diodes inserted in series with each of the output transistors.

8. The method of claim 1 wherein the nonlinear element comprises one or more sets of parallel diodes in series with an output transistor.

9. The method of claim 1 wherein the nonlinear element comprises paralleled strings of multiple serial diodes configured in series with an output transistor.

10. The method of claim 1 wherein the step of applying includes:

generating the linearizing control voltage by applying control currents through the non-linear element or elements; and applying the linearizing control voltage to the base of said at least one output transistor.

11. The method of claim 1 wherein the step of applying includes:

supplying a control voltage to a first input of a feedback amplifier;

supplying an output of the feedback amplifier to an input of a differential amplifier with non-linear local feedback elements;

supplying an output of the differential amplifier to a second input of the feedback amplifier; and wherein the output of the feedback amplifier comprises the linearizing control voltage applied to said at least one output transistor.

12. The method of claim 10 or claim 11 wherein the non-linear element or elements are substantially the sane as the non-linear element or elements in said circuit.

13. The method of claim 10 or claim 11 wherein the non-linear element may include a linear element.

14. A method of reducing distortion while lowering noise at the output of a voltage controlled amplifier, mixer or multiplier circuit, which circuit includes local feedback elements and output transistors having an emitter, collector and base and corresponding series emitter and base series resistances, comprising:

supplying a signal current to a respective output transistor;

applying a derived output signal current to a load resistor to supply an output signal from said circuit;

providing a control voltage for said circuit; and applying a portion of the output signal and the control voltage to a base of at least one of the output transistors to effectively lower the equivalent series emitter and/or internal base series resistance.

15. The method of claim 14 wherein:

the element is at least one linear element and including;

sensing a differential output current of the circuit;

scaling the differential output current; and applying the scaled differential output current to the base of the at least one output transistor in combination with the control voltage.

16. The method of claim 14 wherein the element is at least one nonlinear element in series with the emitter of at least one output transistor.

17. The method of claim 16 wherein the nonlinear element is at least one set of parallel diodes or at least two serial diodes in paralleled strings of diodes.

18. The method of claim 14 wherein the output transistors comprise a differential pair amplifier which includes linear and/or nonlinear local feedback elements, the method including linearizing the control input signal to a base of the differential pair amplifier.

19. Apparatus for reducing the distortion while maintaining or reducing the noise at the output of voltage controlled amplifier, mixer or multiplier circuit, wherein said circuit includes output transistors having an emitter, collector and base, comprising:

a signal circuit integral with the amplifier, mixer or multiplier circuit for providing a signal current to the output transistors;

at least one nonlinear local feedback element inserted in series with a respective output transistor for receiving the signal current;

means for generating a signal voltage from said circuit by applying a derived output signal current to a load resistor to thereby generate the signal voltage;

means for providing a control voltage; and means for applying a portion of the signal voltage and the control voltage to the base of at least one of the output transistors to effectively reduce the distortion while reducing or maintaining the noise.

20. The apparatus of claim 19 including a pair of output transistors and at least a corresponding pair of diodes in series with the emitters of respective output transistors.

21. The apparatus of claim 19 wherein:

the output transistors comprise a differential pair amplifier;

wherein at least one nonlinear element is inserted in series with the differential pair amplifier; and said control voltage is coupled to the base of at least one output transistor of the differential pair amplifier.

22. The apparatus of claim 21 wherein the nonlinear element includes at least one diode coupled in series with the emitter of a respective amplifier of the differential pair amplifier.

23. The apparatus of claim 21 wherein the nonlinear element includes parallel diodes in series with respective output transistors.

24. The apparatus of claim 21 wherein the nonlinear element includes paralleled-series diodes in series with the emitters of respective output transistors.

25. The apparatus of claim 21 wherein the nonlinear element includes parallel strings of serial diodes in series with the emitters of respective output transistors.

26. The apparatus of claim 21 for reducing the output noise of a balanced mixer or multiplier circuit wherein:

said output transistors comprise two differential pair amplifiers;

wherein at least one nonlinear element is inserted in series with a respective amplifier of each differential pair amplifier; and said control voltage is coupled to the bases of two of the output transistors of respective differential pair amplifiers.

27. A method of reducing noise while at least maintaining distortion at the output of a voltage controlled amplifier, mixer or multiplier circuit, which circuit includes a pair of output transistor having an emitter, collector and base, comprising:

passing the emitter currents of the output transistors through respective nonlinear elements disposed in series with the emitters;

wherein a nonlinear element includes a plurality of diodes configured in series; and wherein the plurality of diodes further includes one or more sets of parallel diodes configured in series or at least two serial diodes in paralleled strings of diodes.

28. Apparatus for reducing the noise while maintaining or reducing the distortion, at the output of a voltage controlled amplifier, mixer or multiplier circuit, wherein the circuit includes output transistors having an emitter, collector and base, comprising:

a signal circuit for providing a signal current to the output transistors;

at least one nonlinear element inserted in series with a respective output transistor for receiving the signal current;

means for applying a control voltage to the base of at least one of the output transistors; and wherein the nonlinear element includes one or more sets of parallel diodes inserted in series with the emitter of an output transistor.

29. Apparatus for reducing the output noise of a voltage controlled amplifier which includes output transistors having an emitter, collector and base, comprising:

a linear resistance inserted in series with an emitter of at least one of the output transistors;

current sensing and scaling means for sensing and scaling a differential output current of the voltage controlled amplifier;

means for applying a control voltage to a base of an output transistor; and selectively supplying the scaled output current into a load resistor with the control voltage.

30. The apparatus of claim 29 wherein the voltage controlled amplifier is a balanced mixer or multiplier circuit, wherein the output transistors comprise two differential pair amplifiers providing a balance output signal current, comprising:

a linear resistance inserted in series with an emitter of a respective amplifier of each of the differential pair amplifiers;

wherein said current sensing and scaling means senses and scales the differential output current of a respective differential air amplifier;

wherein said means for applying applies the control voltage to the bases of respective differential pair amplifiers; and selectively supplying each scaled differential output current to a respective base of a current differential pair amplifier in combination with the control voltage.

31. A method of reducing the output noise generated by gain controlled amplifier, analog mixer of multiplier circuits, wherein the circuit includes a pair of output transistors having an emitter, collector and base, comprising:

inserting one or more non-linear element with local feedback in series with at least one of the output transistors; and wherein the non-linear element includes a linear element.

32. A method of reducing the output noise generated by gain controlled amplifier, analog mixer of multiplier circuits, wherein the circuit includes a pair of output transistors having an emitter, collector and base, comprising:

inserting one or more non-linear element with local feedback in series with at least one of the output transistors; and wherein the non-linear element comprises one or more sets of parallel diodes in series with an output transistor.

33. A method of reducing the output noise generated by gain controlled amplifier, analog mixer of multiplier circuits, wherein the circuit includes a pair of output transistors having an emitter, collector and base, comprising:

inserting one or more non-l near element with local feedback in series with at least one of the output transistors; and wherein the non-linear element comprises parallel strings of multiple serial diodes configured in series with an output transistor.

34. Apparatus for reducing the noise while maintaining or reducing the distortion, at the output of a voltage controlled amplifier, mixer or multiplier circuit, wherein the circuit includes output transistors having an emitter, collector and base, comprising:

a signal circuit for providing a signal current to the output transistors;

at least one nonlinear element inserted in series with a respective output transistor for receiving the signal current;

means for applying a control voltage to the base of at least one of the output transistors; and wherein the nonlinear element includes paralleled strings of multiple serial diodes inserted in series with the emitter of an output transistor.

35. A method of reducing or removing distortion in a differential voltage controlled amplifier having an input receiving a control voltage, and local feedback elements including resistances which cause the distortion, comprising:

providing an output current from the voltage controlled amplifier;

applying the output current to a load resistor to generate an output voltage; and applying a combination of the control voltage and at least a portion of the output voltage of the voltage controlled amplifier to the control input of the voltage controlled amplifier.

36. The method of claim 35 wherein the resistances include internal resistance in a diode or transistor or external added resistance.

37. A method reducing or removing distortion in a field effect transistor (FET) voltage controlled amplifier mixer or multiplier circuit having an input receiving a control voltage and which may or may not have local feedback elements, comprising:

providing a signal current from a portion of the output or outputs of said circuit;

applying the signal current to a load resistor to generate a signal voltage; and applying a combination of the signal voltage and control voltage to the gate of at least one the FETS.

* * * * *